US010728504B2

(12) United States Patent
Wakeyama et al.

(10) Patent No.: US 10,728,504 B2
(45) Date of Patent: Jul. 28, 2020

(54) MONITORING CAMERA SYSTEM AND MONITORING METHOD

(71) Applicant: Panasonic Intellectual Property Management Co., Ltd., Osaka (JP)

(72) Inventors: Daisuke Wakeyama, Fukuoka (JP); Katsumi Komatsu, Fukuoka (JP); Takeshi Takahashi, Fukuoka (JP); Takahiro Hyakudome, Kukuoka (JP); Yoko Oie, Fukuoka (JP); Koji Yamaguchi, Fukuoka (JP); Noriaki Kido, Fukuoka (JP); Yasuhiro Horiuchi, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/129,057

(22) Filed: Sep. 12, 2018

(65) Prior Publication Data
US 2019/0104283 A1  Apr. 4, 2019

(30) Foreign Application Priority Data

Sep. 29, 2017 (JP) .................................. 2017-191209

(51) Int. Cl.
H04N 7/18 (2006.01)
G08B 13/196 (2006.01)
G08B 13/19 (2006.01)

(52) U.S. Cl.
CPC ............. *H04N 7/183* (2013.01); *G08B 13/19* (2013.01); *G08B 13/19608* (2013.01);
(Continued)

(58) Field of Classification Search
CPC ........ G08B 13/19656; G08B 13/19658; H04N 7/188; H04N 7/183; H04N 5/2258; G06F 3/04842; G06F 3/04886
See application file for complete search history.

(56) References Cited

U.S. PATENT DOCUMENTS 6,313,872 B1 * 11/2001 Borg ................. G08B 13/19634
348/155
2006/0190750 A1 * 8/2006 Maggi ................... G06F 1/3203
713/320

(Continued)

FOREIGN PATENT DOCUMENTS

JP       2009-237648 A      10/2009

*Primary Examiner* — Peet Dhillon
(74) *Attorney, Agent, or Firm* — Seed IP Law Group LLP

(57) ABSTRACT

A monitoring camera system includes a camera and a master device communicating with the camera and a mobile communication terminal having a display. The camera detects movement of a person at a first timing in an imaging area and transmits a predetermined notification to the master device at a second timing. The master device transmits an image request for requesting a first captured image captured at the first timing and a second captured image captured at the second timing to the camera, based on the predetermined notification from the camera. The camera transmits the first captured image and the second captured image in association with each other to the master device based on the image request transmitted from the master device. The master device transmits the first captured image and the second captured image in association with each other to the mobile communication terminal to be displayed on the display.

9 Claims, 12 Drawing Sheets

(52) U.S. Cl.
CPC . *G08B 13/19656* (2013.01); *G08B 13/19658* (2013.01); *H04N 7/188* (2013.01)

(56) References Cited

U.S. PATENT DOCUMENTS

| | | | | |
|---|---|---|---|---|
| 2011/0234832 A1* | 9/2011 | Ezoe | .................. | H04N 5/23206 |
| | | | | 348/222.1 |
| 2013/0329100 A1* | 12/2013 | Desai | ................... | H04N 5/2258 |
| | | | | 348/262 |
| 2015/0307048 A1* | 10/2015 | Santora | .................. | G08G 1/205 |
| | | | | 348/148 |
| 2016/0065615 A1* | 3/2016 | Scanzano | .............. | H04L 63/123 |
| | | | | 348/143 |
| 2016/0105644 A1* | 4/2016 | Smith | .................... | H04N 7/188 |
| | | | | 348/159 |

* cited by examiner

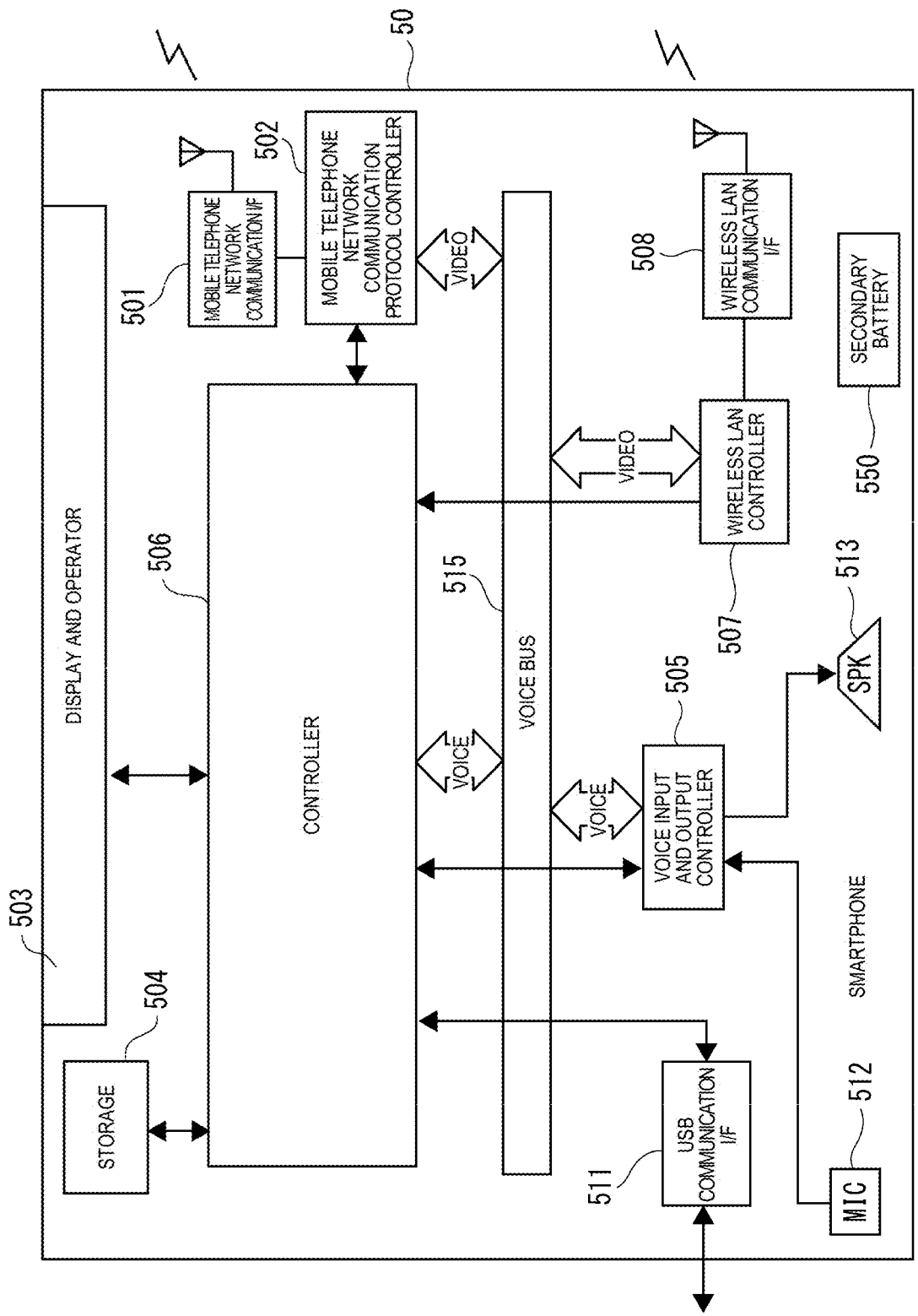

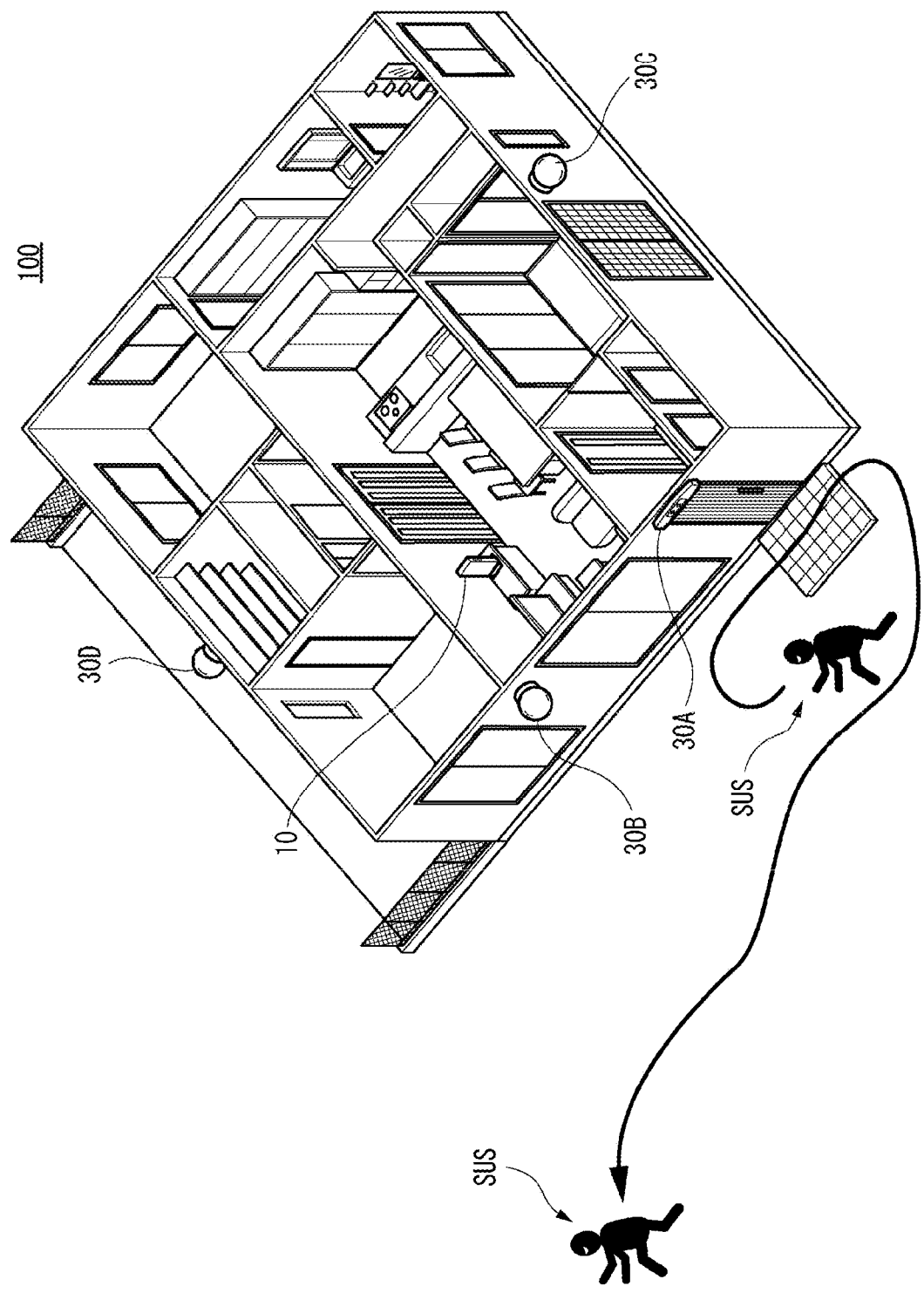

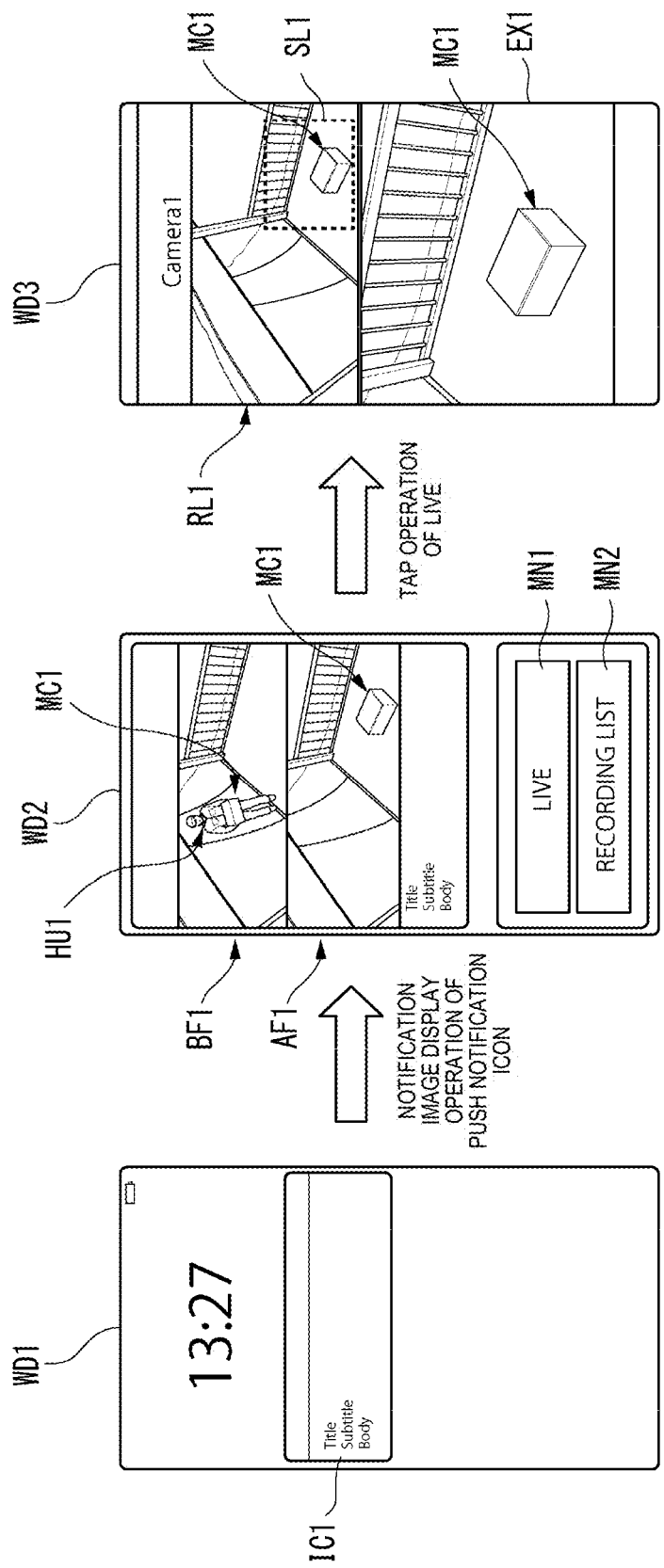

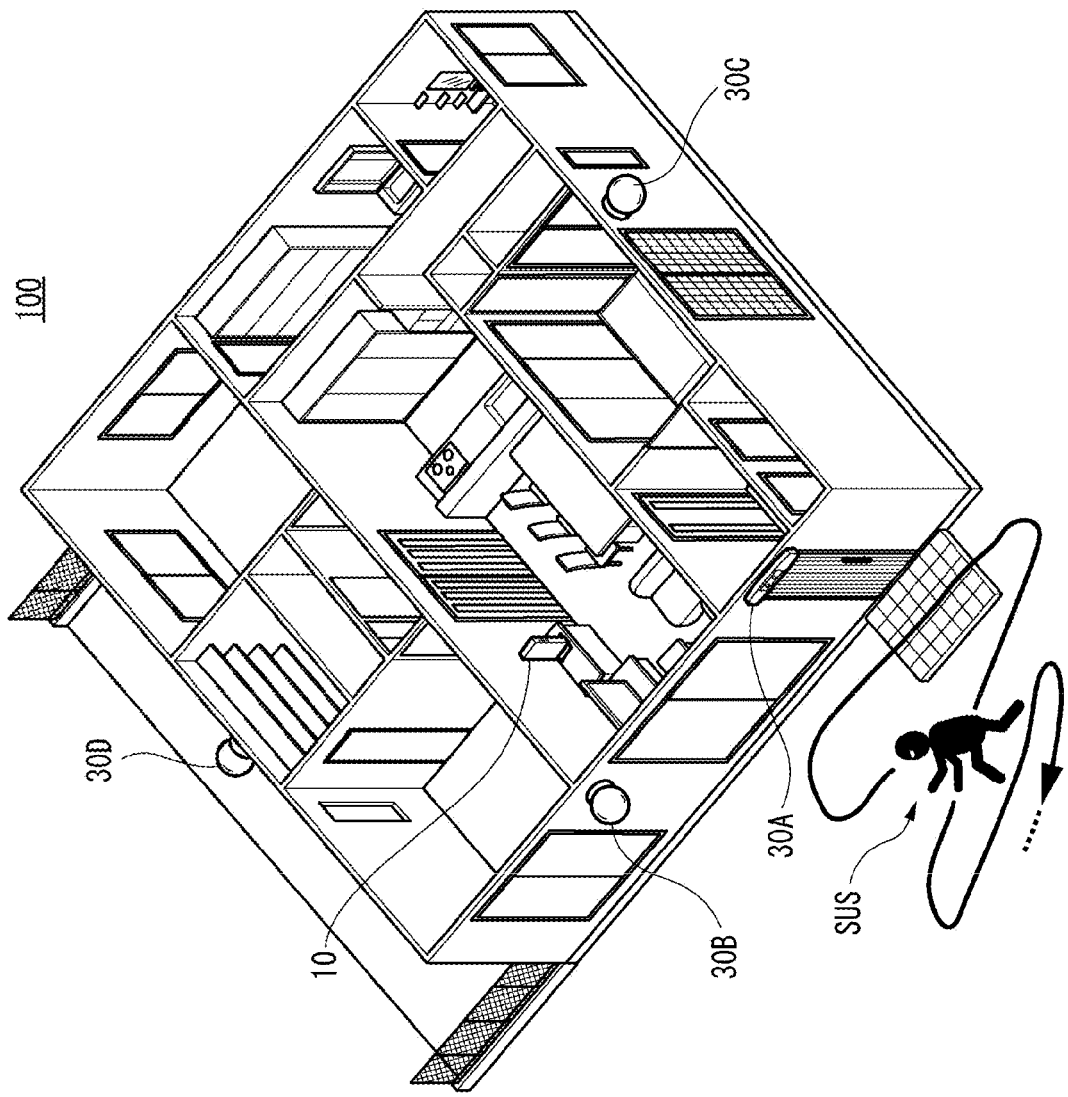

MONITORING CAMERA SYSTEM AND MONITORING METHOD

BACKGROUND

1. Technical Field

The present disclosure relates to a monitoring camera system including, for example, one or more cameras which detect a person or movement of the person, and a monitoring method using the monitoring camera system.

2. Description of the Related Art

In recent years, as a part of home security, a monitoring camera system in which, for example, one or more security cameras (that is, monitoring cameras) are installed in or around an individual house, and in a case where a person (for example, a visitor or a suspicious person) captured by each of the security cameras in a video is taken, the video is recorded, is realized.

Japanese Patent Unexamined Publication No. 2009-237648 discloses an operator safety inspection apparatus which performs safety inspection of an operator by determining abnormality in a case of detecting a state where the operator who moves onto an image has stopped for a certain period of time or more by image processing for the purpose of performing safety inspection of the operator who performs an independent work at an indoor work site.

In the above-described Japanese Patent Unexamined Publication No. 2009-237648, similar to the monitoring camera system of the above-described home security, a person (for example, a visitor or a suspicious person) who has approached the individual house or movement of the person is monitored using the videos captured by one or more monitoring cameras is not considered. Therefore, even when the technology described in the Japanese Patent Unexamined Publication No. 2009-237648 is applied to the monitoring camera system of the above-described home security, there is a problem that the monitoring camera system cannot present an image showing a situation of a plurality of monitoring timings captured by one or more monitoring cameras to the user (for example, residents of individual houses) so that the user can grasp the situation. In other words, the user cannot immediately grasp the difference in the monitoring situation in a monitoring region (for example, around the entrance of the individual house), for example, at a certain timing or at another timing after the certain timing in the individual house or around the individual house, and convenience as a monitoring camera system is not excellent.

SUMMARY

The disclosure is devised in a view of the above-described situation of the related art, and is to provide a monitoring camera system and a monitoring method which present an image showing each situation of a plurality of monitoring timings captured by one or more monitoring cameras to a user so that the user can grasp the situations, and have high convenience for the user while performing efficient monitoring.

According to the disclosure, there is provided a monitoring camera system including at least one camera and a master device capable of communicating with the camera and a mobile communication terminal having a display, in which the camera detects movement of a person at a first timing in an imaging area and transmits a predetermined notification to the master device at a second timing after the first timing, in which the master device transmits an image request for requesting a first captured image captured at the first timing and a second captured image captured at the second timing by the camera, to the camera, based on the predetermined notification transmitted from the camera, in which the camera transmits the first captured image and the second captured image in association with each other to the master device based on the image request transmitted from the master device, and in which the master device transmits the first captured image and the second captured image transmitted from the camera in association with each other to the mobile communication terminal so as to be displayed on the display.

According to the disclosure, it is possible to present an image showing each situation of a plurality of monitoring timings captured by one or more monitoring cameras to a user so that the user can grasp the situations, and to improve convenience of the monitoring camera system for the user while performing efficient monitoring.

BRIEF DESCRIPTION OF DRAWINGS

FIG. 5 is a block diagram illustrating an example of an inner configuration of a smartphone;

FIG. 6A is an explanatory view illustrating an example of a movement path when a suspicious person stays while wandering around an imaging area of a camera near the entrance and leaves the individual house after a certain period of time elapses;

FIG. 7 is a view illustrating a transition example of a screen displayed on the smartphone;

FIG. 10A is an explanatory view illustrating an example of a movement path when the suspicious person continues to wander through the imaging area of the camera near the entrance all the time.

DETAILED DESCRIPTION

Hereinafter, an embodiment (hereinafter, referred to as the embodiment) in which a monitoring camera system and a monitoring method according to the disclosure are specifically disclosed will be described in detail with reference to the appropriate drawings. However, there is a case where description detailed more than necessary is omitted. For example, there is a case where detailed descriptions of already well-known matters and redundant descriptions on substantially the same configuration are omitted. This is to avoid the unnecessary redundancy of the following description and to make it easy to understand the disclosure for those skilled in the art. In addition, the attached drawings and the following description are provided to enable those skilled in the art to fully understand the disclosure, and are not intended to limit the subject matter described in the claims.

The monitoring camera system according to the embodiment has, for example, a configuration in which a plurality of monitoring cameras are installed within a site (for example, including an indoor space or an outdoor space, such as a garden and a garage, within the site) of a house (that is, an individual house) of a user of the monitoring camera system (hereinafter, abbreviated as "user"). However, the monitoring camera system according to the embodiment is not limited to security applications within the site of the individual house of the user, and for example, the monitoring camera system may be used as security application in any place of business, such as shops, factories, or offices.

In addition, the disclosure is not limited to the monitoring camera system, can also be expressed as a monitoring method using the monitoring camera system, and can also be defined as a category of a device which is an access point or a monitoring camera that configures the monitoring camera system or a category of a program for causing the access point or the monitoring camera to execute different types of predetermined processing respectively.

Figure 1:
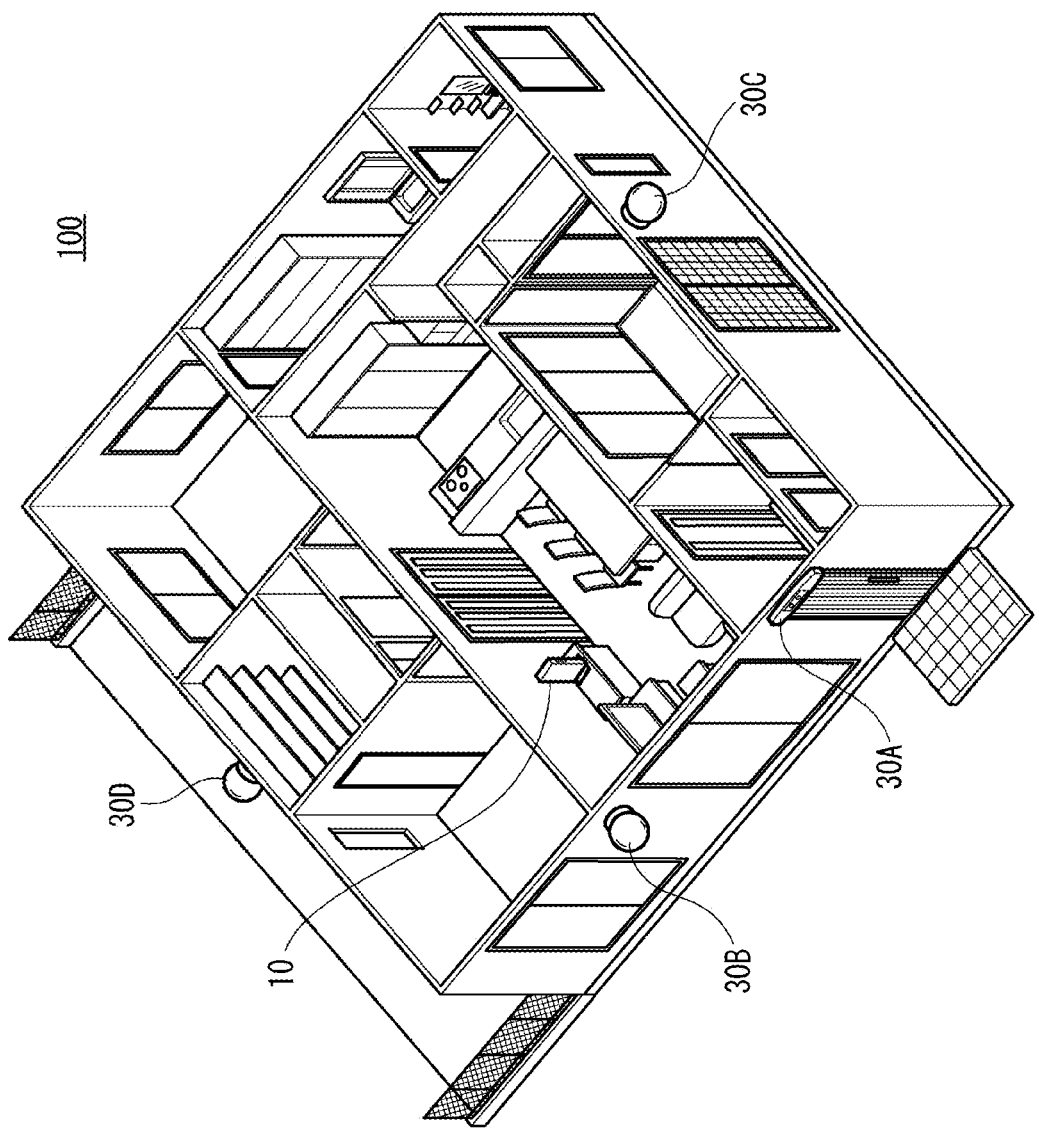
FIG. 1 is a view illustrating a layout example in which an access point and cameras which configure a monitoring camera system according to the embodiment are installed in an individual house of a user.
Figure 2:
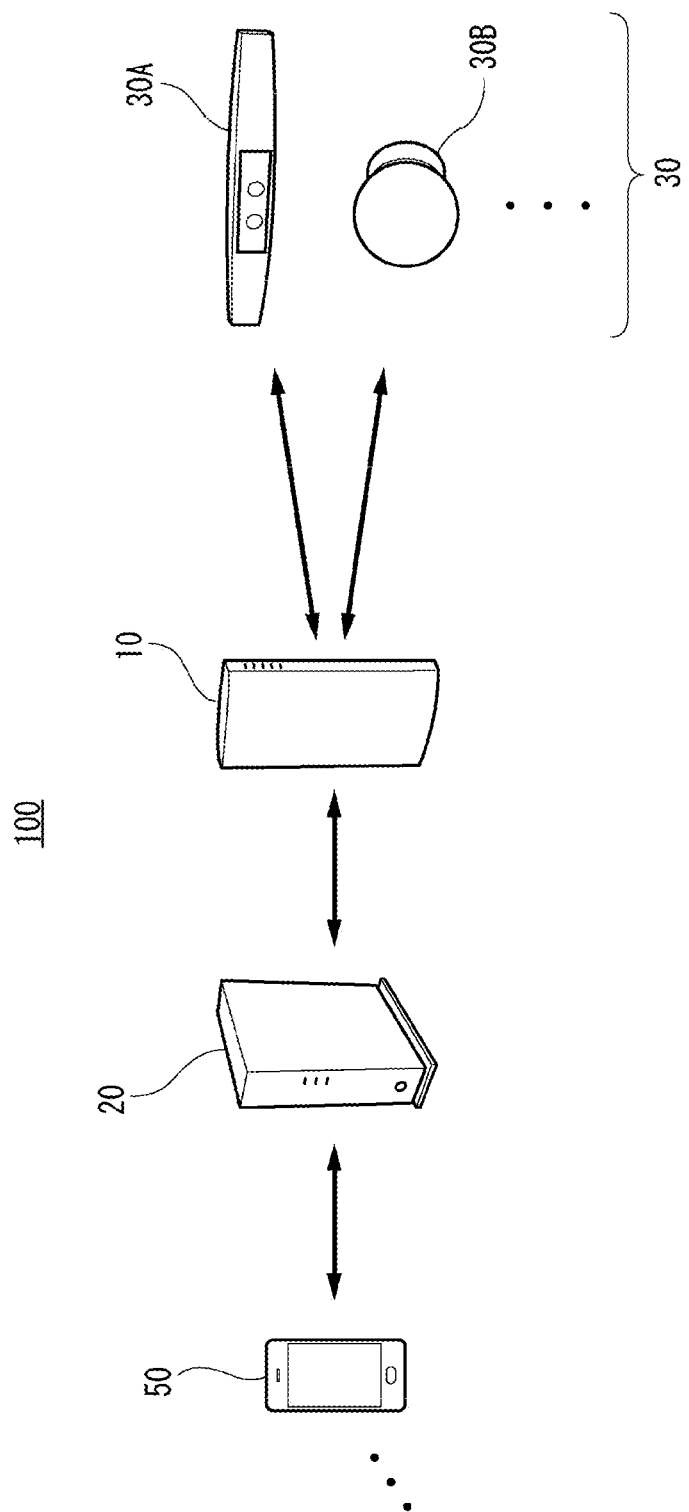
FIG. 2 is a view illustrating a system configuration example of the monitoring camera system according to the embodiment.

FIG. 1 is a view illustrating a layout example in which access point 10 and cameras 30A, 30B, 30C, and 30D which configure monitoring camera system 100 according to the embodiment are respectively installed within the individual house of the user. FIG. 2 is a view illustrating a system configuration example of monitoring camera system 100 according to the embodiment. Monitoring camera system 100 is installed, for example, within the individual house of the user, and has a configuration in which router 20 which is wirelessly connected to smartphone 50 and a plurality of cameras 30A, 30B, 30C, and 30D are connected to each other via access point 10 so as to communicate with each other. In FIG. 1, smartphone 50 and router 20 are omitted.

Access point 10 (an example of a master device) has a role as a gateway related to communication between various devices that configure monitoring camera system 100 (refer to FIG. 2). In other words, access point 10 is a control device which controls the overall operation of monitoring camera system 100, is wirelessly connected to camera 30, for example, using a wireless LAN (Local Area Network), such as Wi-Fi (registered trademark), and is wire-connected to router 20 using a wired LAN.

Access point 10 has a function of controlling operation modes of a plurality of cameras 30 and a function of recording data of captured videos captured by each of cameras 30. The operation mode is a mode that defines the operation state of camera 30, and includes, for example, a sleep mode and a standby mode. The sleep mode is a state where the operation of each part other than infrared sensor 313 at each part (refer to FIG. 4) of camera 30 is temporarily stopped. The standby mode is a state where each part of camera 30 including infrared sensor 313 is operable.

Router 20 is wire-connected to access point 10 using the wired LAN, such as Ethernet (registered trademark), and is wirelessly connected to smartphone 50 using the wireless LAN, such as Wi-Fi (registered trademark). Router 20 performs relay processing of data or information between the plurality of cameras 30 and smartphone 50 or between access point 10 and smartphone 50. Router 20 configures monitoring camera system 100, and is installed within the individual house of the user.

Four cameras 30A, 30B, 30C, and 30D are so-called monitoring cameras (security cameras), have a function of enabling calling and communicating with smartphone 50 via access point 10 and router 20, and are wirelessly connected to access point 10 using the wireless LAN. In FIG. 1, as cameras, for example, camera 30A for an entrance which images the entrance of the individual house as a main imaging area, and cameras 30B, 30C, and 30D which are installed on outer walls or the like of the individual house and respectively image the surrounding (for example, a garden or a garage) of the individual house as different imaging areas, are installed.

In addition, although not illustrated in FIG. 1, one or more cameras similar to 30A to 30D may be additionally installed in a predetermined place (for example, a corridor or a room) within the individual house. In the following description, in a case where it is not particularly necessary to distinguish the type of cameras 30A, 30B, 30C, and 30D, the cameras are collectively referred to as "camera 30".

For example, as illustrated in FIG. 1, camera 30A performs imaging so as to include the entrance of the individual house of the user as an imaging area in the standby mode. In other words, in the sleep mode, camera 30A does not image the imaging area of camera 30A in order to suppress an increase in power consumption of camera 30A itself.

Similarly, in the standby mode, camera 30B performs imaging so as to include the surrounding (for example, the whole outer wall part of a living room) of the individual house of the user as an imaging area. In other words, in the sleep mode, camera 30B does not image the imaging area of camera 30B in order to suppress an increase in power consumption of camera 30B itself.

Similarly, in the standby mode, camera 30C performs imaging so as to include the surrounding (for example, the whole outer wall part of a Japanese-style room) of the individual house of the user as an imaging area. In other words, in the sleep mode, camera 30C does not image the imaging area of camera 30C in order to suppress an increase in power consumption of camera 30C itself.

Similarly, in the standby mode, camera 30D performs imaging so as to include the surrounding (for example, the whole garden) of the individual house of the user as an imaging area. In other words, in the sleep mode, camera 30D does not image the imaging area of camera 30D in order to suppress an increase in power consumption of camera 30D itself.

In the embodiment, for example, in order to simplify attachment of each of cameras 30 that configure monitoring camera system 100 to the ceiling or the wall surface inside the individual house or the pole or the outer wall outside the individual house, cameras 30 are respectively configured by battery driving. In other words, although will be described in detail later with reference to FIG. 4, each part of camera 30 is supplied with electric power necessary for operation from battery 314, and is not supplied with constant electric power via an AC adapter or the like from a commercial power source. Therefore, when monitoring camera system 100 of the embodiment is specifically realized, since each of cameras 30 is driven by batteries, it is required that power consumption is suppressed such that power consumption of each of cameras 30 does not increase. Therefore, as described above, in a case where each of cameras 30 does not receive instructions from access point 10, for example, each of cameras 30 is in the sleep mode (that is, power saving mode) where the operation of each part other than infrared sensor 313 which will be described later is inactive. Therefore, camera 30 according to the embodiment considerably reduces the complexity of attaching camera 30 to the inside of the individual house of the user, compared to attachment in a case of being supplied with constant electric power from the commercial power source.

Since camera 30 is configured by battery driving, in a case where a shift instruction of the operation mode (for example, a shift instruction to the standby mode) is not received from access point 10, camera 30 sets the operation mode to the sleep mode. In other words, when receiving the shift instruction (for example, the shift instruction to the standby mode) of the operation mode from access point 10, camera 30 shifts the operation mode from the sleep mode to the standby mode. In addition, even when camera 30 does not receive the shift instruction (for example, the shift instruction to the standby mode) of the operation mode from access point 10, for example, in a case where a person or the movement of the person is detected by infrared sensor 313 of camera 30 itself, the operation mode may be autonomously shifted from the sleep mode to the standby mode. Accordingly, in a case where camera 30 does not receive or cannot receive the shift instruction of the operation mode from access point 10, it is possible to autonomously shift the operation mode of camera 30 from the sleep mode to the standby mode, and to improve security of the individual house. On the contrary, in a case where infrared sensor 313 does not detect a person or movement for a certain period of time, camera 30 may autonomously shift the operation mode of camera 30 from the standby mode to the sleep mode. Accordingly, in a case where camera 30 does not receive or cannot receive the shift instruction of the operation mode from access point 10, it is possible to autonomously shift the operation mode of camera 30 from the standby mode to the sleep mode, and to achieve power saving.

Smartphone 50 (one example of a mobile communication terminal) is, for example, possessed by the user, and wirelessly connected to access point 10 locally (that is, within the individual house of the user) via router 20 (for example, a wireless router) using the wireless LAN. Therefore, smartphone 50 can transmit and receive data or information (for example, a calling function and a communication function) with various cameras 30 installed in the individual house via router 20 and access point 10.

In addition, smartphone 50 is wirelessly connected to other mobile phones or smartphones via a broadband mobile telephone network (so-called a carrier network) using various wireless communication standards, such as 3G (third generation mobile communication system), 4G (fourth generation mobile communication system), or 5G (fifth generation mobile communication system). Therefore, smartphone 50 can transmit and receive data or information to and from other wirelessly connected mobile phones or smartphones via the broadband mobile telephone network.

Figure 3:
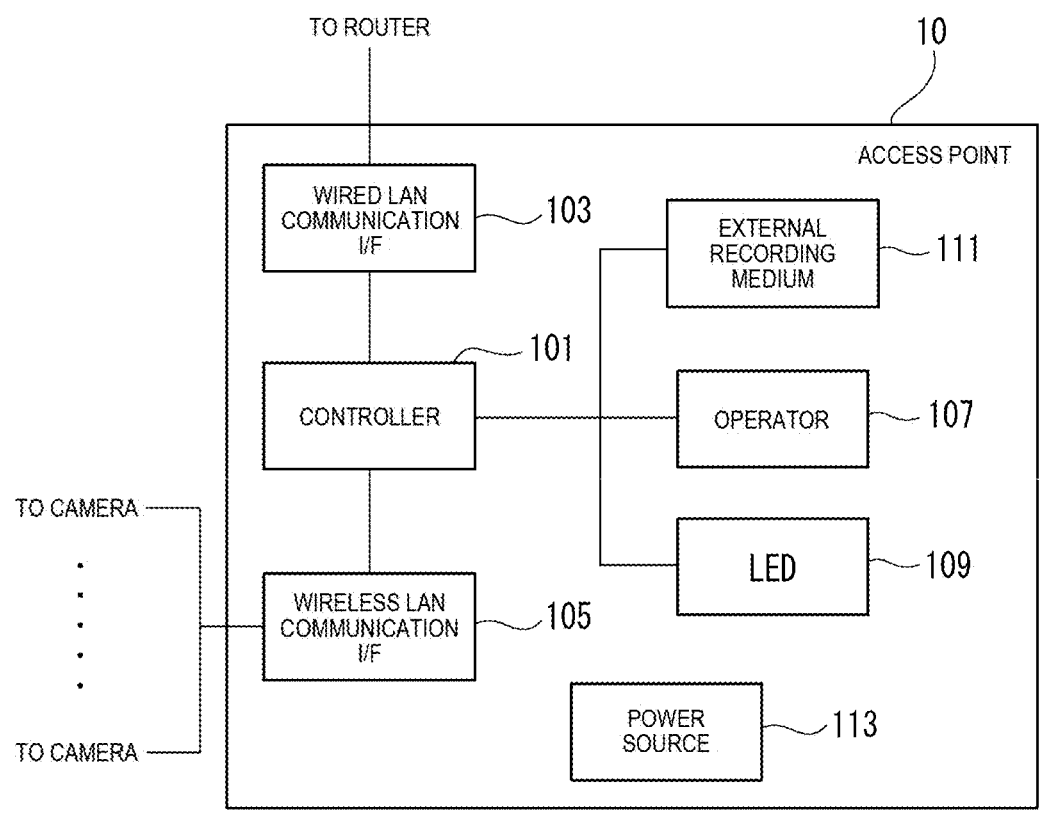
FIG. 3 is a block diagram illustrating an example of an inner configuration of the access point.

FIG. 3 is a block diagram illustrating an example of an inner configuration of access point 10. Access point 10 includes controller 101, wired LAN communication I/F 103, wireless LAN communication I/F 105, operator 107, light emitting diode (LED) 109, external recording medium 111, and power source 113.

Controller 101 is configured by using a central processing unit (CPU), a micro processing unit (MPU), or a digital signal processor (DSP), and performs signal processing for controlling the overall operation of each part of access point 10, data input and output processing with other parts, data arithmetic processing, and data storage processing.

Controller 101 performs various settings (for example, new registration of camera 30 capable of communicating with access point 10 and resetting of various setting information) based on, for example, an operation signal from operator 107.

There are two types of notification methods for access point 10 according to the embodiment to notify smartphone 50 of a motion detection notification from camera 30. The function of the notification method is to notify of an image at the time of detecting a motion of a person or the like (first notification method), or to notify of an image at the time of detecting a motion of a person or the like and an image at the time of not detecting a motion (second notification method). The first notification method is an immediate notification, and the second notification method is a before-and-after notification. In other words, in access point 10, either the immediate notification or the before-and-after notification is set as a notification method from access point 10 to smartphone 50.

The setting of the immediate notification is setting in which the notification (that is, motion detection notification) indicating that the movement (motion) of a person is detected in the imaging area of camera 30 by camera 30, and every time access point 10 receives the motion detection notification from camera 30, the movement of a person is detected, is immediately transmitted to smartphone 50. In other words, according to the immediate notification, smartphone 50 can immediately recognize that the movement (motion) of the person is detected by camera 30 by the immediate notification from access point 10.

The setting of the before-and-after notification is setting in which the before-and-after notification is transmitted to smartphone 50 when access point 10 receives the notification (that is, the before-and-after notification) which is transmitted from camera 30 at the point of time at which camera 30 did not detect the motion of the person and indicates the detection of the motion of the person and the end of the detection of the motion of the person in a case where both when the movement (motion) of the person in the imaging area of camera 30 is detected by camera 30 (first time: before) and the movement (motion) of the person is not detected by camera 30 after the detection (second time: after). In other words, according to the before-and-after notification, smartphone 50 can immediately recognize changes in situation between the time when the movement (motion) of the person is detected by camera 30 and the time when the detection of the movement (motion) of the person ends.

In addition, controller 101 acquires the data of the captured video transmitted from camera 30 or the captured video (for example, moving image) configured with a plurality of frames of captured video via wireless LAN communication I/F 105, writes the data in external recording medium 111, and records (that is, video recording) the data.

Further, controller 101 turns on or blinks LED 109 according to a turning-on or blinking pattern that corresponds to the operation state (for example, a state of being on and off the power source of access point 10 and a state of the presence or absence of access to external recording medium 111) of access point 10.

Further, when controller 101 acquires the motion detection notification (refer to the description later) or the before-and-after notification (refer to the description later) transmitted from camera 30 via wireless LAN communication I/F 105, controller 101 transmits an acquisition request of the captured image captured by camera 30 to camera 30 via wireless LAN communication I/F 105.

Further, when controller 101 acquires a captured image pair (refer to the description later) configured with two captured images transmitted from camera 30 via wireless LAN communication I/F 105, controller 101 temporarily stores the captured image pair in RAM 101 (not illustrated) embedded in access point 10. Controller 101 transmits a push notification (refer to the description later) to smartphone 50 via wired LAN communication I/F 103 and router 20.

Wired LAN communication I/F 103 is wire-connected to router 20 using the wired LAN, such as Ethernet (registered trademark), and transmits and receives data or information to and from router 20.

Wireless LAN communication I/F 105 is wirelessly connected to camera 30 using the wireless LAN, such as Wi-Fi (registered trademark), and transmits and receives data or information to and from camera 30.

Operator 107 receives the operation of the user with respect to access point 10 and sends an operation signal based on the operation to controller 101. For example, operator 107 includes a button for instructing new registration of camera 30 which is capable of communicating with access point 10 and a button for instructing reset (deletion) of various pieces of setting information.

Under the control of controller 101, LED 109 is turned on or blinked according to the turning-on or blinking pattern that corresponds to the operation state (for example, a state of being on and off the power source of access point 10 and a state of the presence or absence of access to external recording medium 111) of access point 10.

External recording medium 111 (an example of a storage) is configured by using a recording medium, such as a semiconductor memory (for example, an SD card), and records (that is, video recording) data of captured videos transmitted from camera 30 under the control of controller 101.

Power source 113 is constantly supplied with power from, for example, a commercial power source, and supplies the power necessary for each operation with respect to each part of access point 10.

Figure 4:
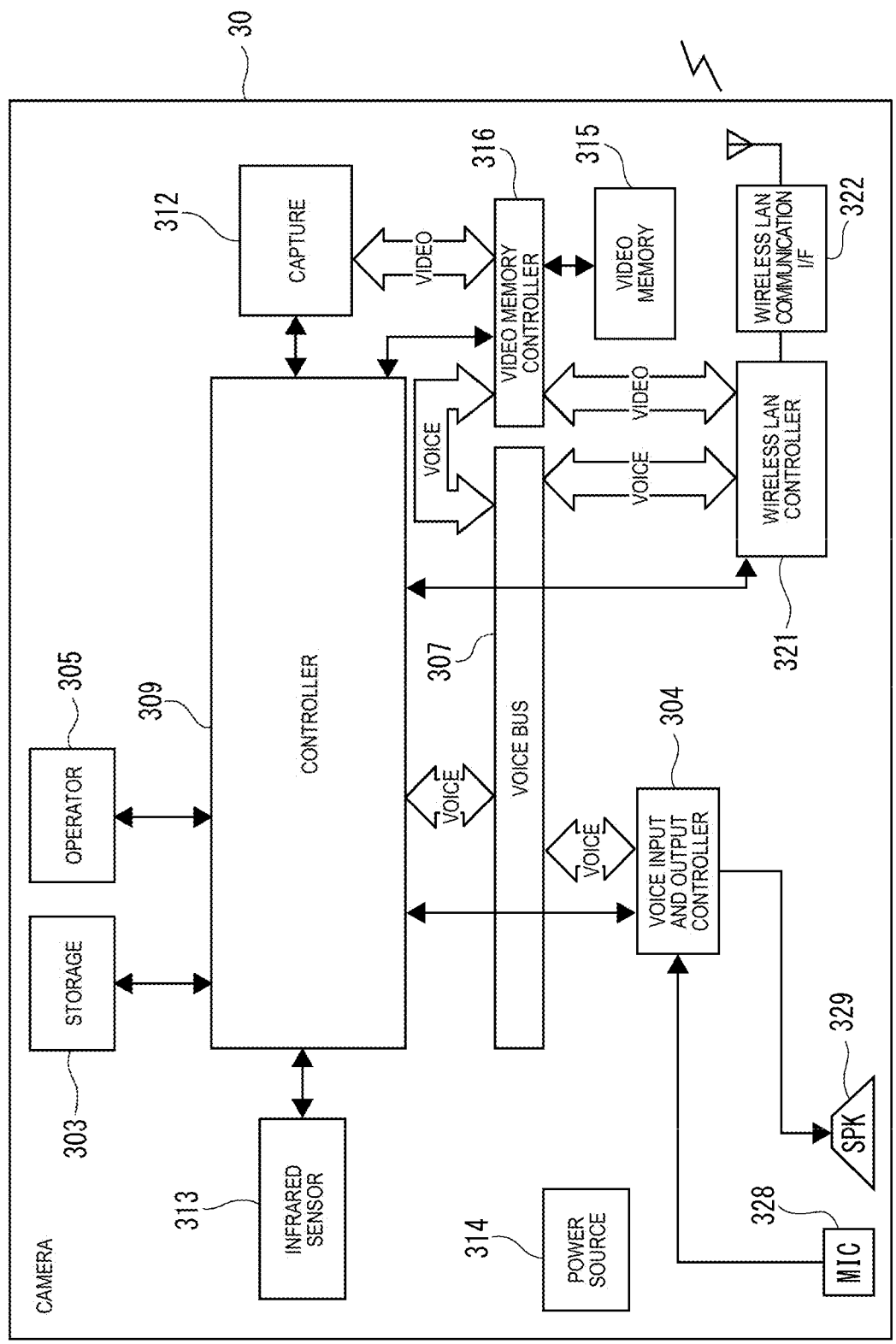
FIG. 4 is a block diagram illustrating an example of an inner configuration of the camera.

FIG. 4 is a block diagram illustrating an example of an inner configuration of camera 30. Camera 30 includes controller 309, storage 303, and operator 305. Camera 30 performs the operation related to the imaging and stores the operation in storage 303 or video memory 315, or receives an input operation of a user or a third person (for example, a person who has approached the individual house of the user) in operator 305.

Storage 303 is configured using, for example, a random access memory (RAM) and a read only memory (ROM), holds programs and data necessary for the operation of camera 30 in the ROM, and temporarily holds data or information in the RAM when performing various types of processing using the program and data in controller 309. In addition, storage 303 may buffer (store) the data of the captured video data for a certain period of time immediately after camera 30 is shifted to the standby mode. The certain period of time during which the buffering is possible is determined in accordance with the data capacity of storage 303, and is, for example approximately 5 seconds. It is needless to say that the certain period of time is not limited to approximately 5 seconds.

Operator 305 is configured by using buttons that can receive operations of the user or the third person (for example, a person who has approached the individual house of the user), and sends an operation signal based on the operation of the user or the third person to controller 309.

Controller 309 is configured using a processor (for example, a CPU, an MPU or a DSP), and performs signal processing for overall control of the operation of each part of camera 30, data input and output processing with other parts, data arithmetic processing, and data storage processing.

For example, controller 309 performs various types of image processing (for example, detection processing of the person who appeared in the imaging area or a movement (motion) of the person) by using the image (hereinafter, referred to as "captured image") captured by capture 312. In the embodiment, the processing of detecting the person or the movement (motion) of the person in camera 30 is a so-called known technology, and for example, the processing is performed based on an interframe difference (that is, a temporal difference of image contents) of the captured image of camera 30.

Controller 309 sets various settings for camera 30 (for example, setting of an angle of view defining the imaging area of camera 30, setting of the operation mode, and setting of the notification method at access point 10) or performs processing in accordance with the various settings, for example, based on the operation signal from operator 30. In other words, camera 30 recognizes the settings related to the motion detection notification method (specifically, the immediate notification or the before-after-notification) of access point 10.

In addition, controller 309 has timer 309T for measuring the time, and based on the output of timer 309T, controller 309 shifts (that is, switches) the operation mode of camera 30 from the standby mode to the sleep mode in a case where a state where the person (for example, a suspicious person who has approached the vicinity of the individual house of the user) was not detected by infrared sensor 313 for a certain period of time (for example, 1 minute) continues.

In addition, in a case where a person (for example, a suspicious person who has approached the vicinity of the individual house of the user) is detected by infrared sensor 313 regardless of the type of the immediate notification or the before-after-notification at access point 10, controller 309 does not perform the detection of the movement (motion) of the person until a predetermined period (motion non-detection time which will be described later, and for example, 30 seconds) has elapsed after the detection. Meanwhile, in a case where the before-after-notification is set in access point 10, controller 309 preferentially uses the motion detection end waiting time (refer to the description later) rather than the motion non-detection time (refer to the description later), and continues the processing of detecting the presence or absence of the movement (motion) of the person after the time when the movement (motion) of the person is detected for the first time until the motion detection end waiting time has elapsed.

Figure 9:
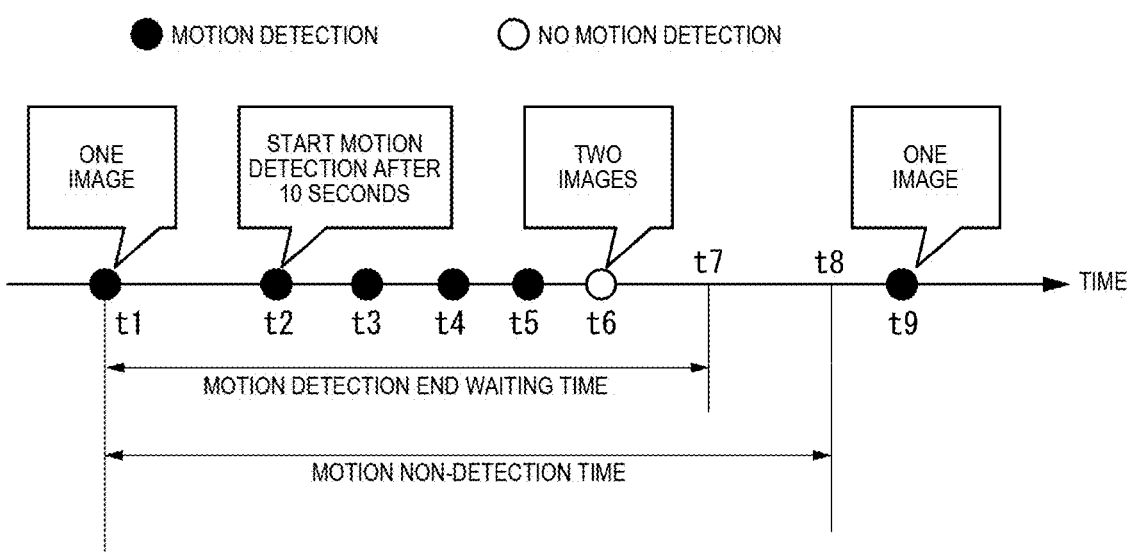
FIG. 9 is an explanatory diagram of motion detection end waiting time and motion non-detection time.

Here, with reference to FIG. 9, the motion detection end waiting time and the motion non-detection time in camera 30 will be described. FIG. 9 is an explanatory diagram of the motion detection end waiting time and the motion non-detection time. The time axis of FIG. 9 is the time axis related to the description of the processing of camera 30.

On the time axis of FIG. 9, time t1 is the timing at which the motion of the person is detected by camera 30. Although will be described in detail with reference to FIG. 6B or FIG. 10B which will be described later, camera 30 acquires the motion detection notification indicating that the motion of the person is detected at time t1 and a captured image at the timing of time t1, and transmits the motion detection notification and the captured image to access point 10. Every time camera 30 detects the motion of the person, when the motion detection notification or the captured image at the time of detection is transmitted to access point 10, the power consumption of camera 30 configured by battery driving increases.

Here, in the embodiment, even in a case where either the immediate notification or the before-after-notification is set in access point 10, in order to suppress an increase in power consumption of camera 30, the motion non-detection time (for example, 30 seconds from time t1 to time t8) is set to be valid. The motion non-detection time is time when the camera 30 does not perform processing of detecting the motion of the person based on the interframe difference using the plurality of captured images (that is, the presence or absence of the motion of the person is not detected) even in a case where infrared sensor 313 detects the person. In other words, since camera 30 does not perform the processing of detecting the motion of the person during the motion non-detection time, consequently, the motion detection notification indicating that the motion of the person is detected as well as the captured image at the time of the detection are not transmitted to access point 10. Therefore, in a case where the motion of the person is detected at time t1, camera 30 does not perform the processing of detecting the motion of the person from time t1 to time t8 when the motion non-detection time elapses, the motion detection notification or the captured image is not transmitted to access point 10, and thus, it is possible to suppress an increase in power consumption. However, infrared sensor 313 is in operation from time t1 to time t8 when the motion non-detection time elapses. Accordingly, camera 30 can detect the presence or absence of the person himself or herself in the imaging area by infrared sensor 313 even from time t1 to time t8 when the motion non-detection time elapses, and it is possible to grasp the presence or absence of the detection of the person himself or herself while suppressing the increase in power consumption.

Figure 6B:
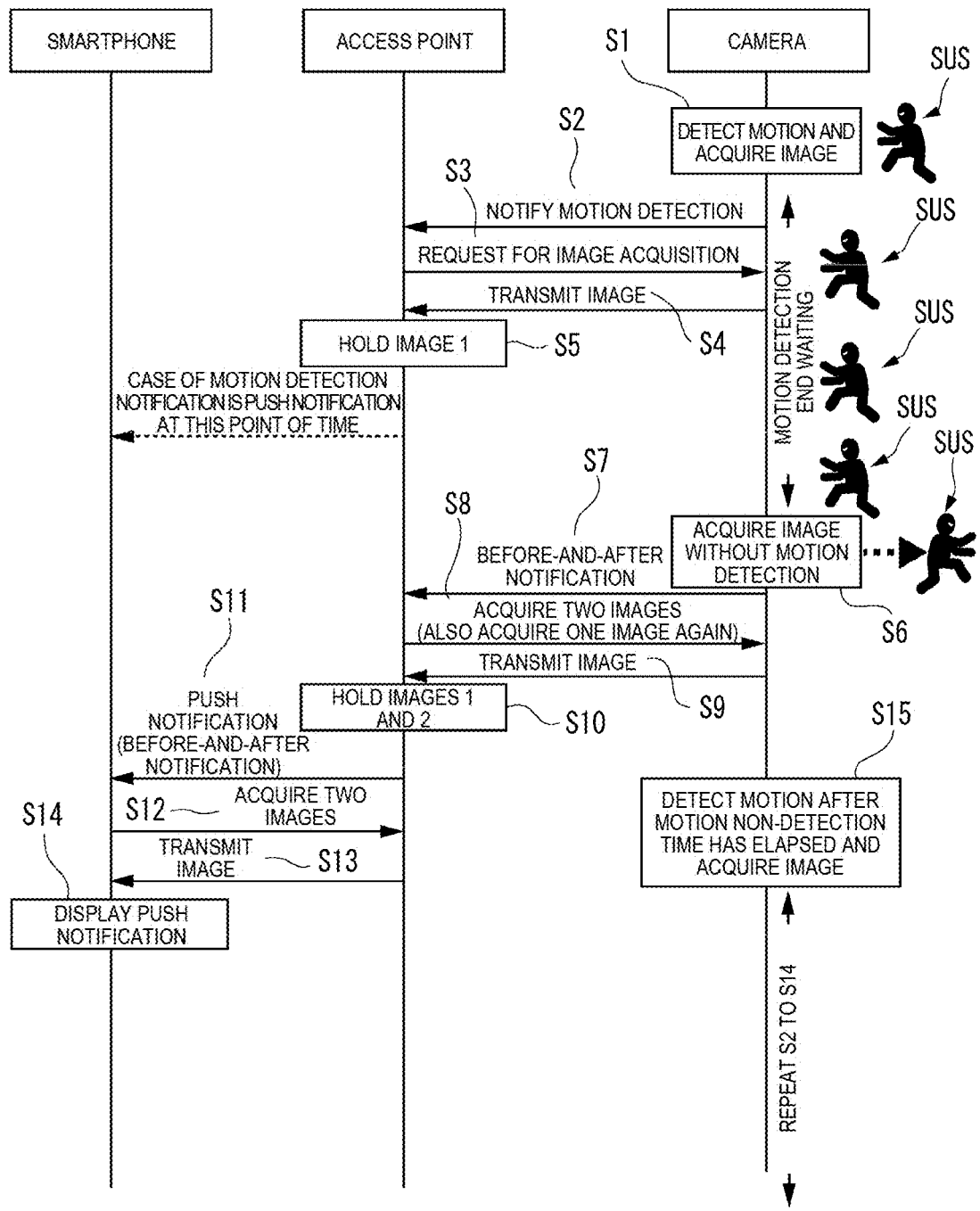
FIG. 6B is a sequence view illustrating an example of an operation order of an access point, the camera near the entrance, and a smartphone possessed by the user, which correspond to the movement path of the suspicious person illustrated in FIG. 6A.
Figure 10B:
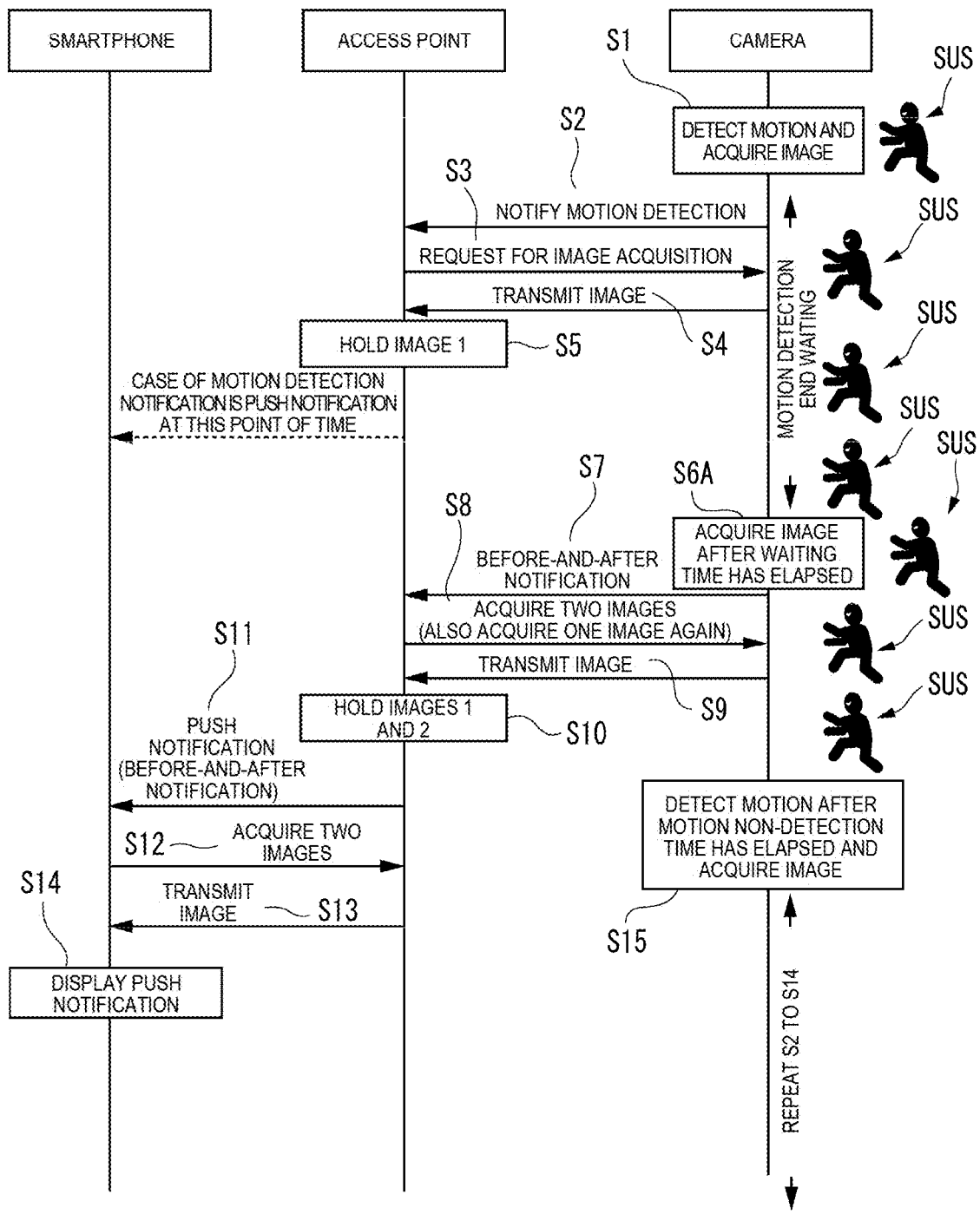
FIG. 10B is a sequence view illustrating an example of an operation order of an access point, the camera near the entrance, and the smartphone possessed by the user, which correspond to the movement path of the suspicious person illustrated in FIG. 10A.

In addition, in a case where the before-after-notification is set, as described above, the data of the captured image at different timings is transmitted from camera 30 to access point 10 (refer to FIGS. 6B and 10B). The different timing is, for example, timing at which the motion of the person is detected and timing at which the motion of the person is no longer detected. Therefore, in a case where the before-and-after notification is set in access point 10, camera 30 can transmit the pair of two captured images that can be shown in a time series which has been changed and how the change has occurred in the imaging area at the timing when the motion of the person is detected and at the timing when the motion of the person is no longer detected, to access point 10.

During the setting of the before-and-after notification, in a period that overlaps the motion non-detection time, the motion detection end waiting time (for example, 27 seconds from time t1 to time t7) is set to be valid prior to the motion non-detection time. The motion detection end waiting time is started from the point of time when the motion of the person is detected for the first time (for example, at time t1) and camera 30 waits until the motion of the person is no longer detected after the point of time (for example, time t1). The start timing of the motion non-detection time and the start timing of the motion detection end waiting time are the same as each other. In other words, during the motion detection end waiting time, camera 30 performs the processing of detecting the motion of the person. Therefore, when camera 30 no longer detects the motion of the person (that is, finishes the detection of the motion of the person) during the motion detection end waiting time, camera 30 transmits the before-and-after notification to access point 10, or transmits the pair of the captured images at the point of time (for example, time t1) when the motion of the person is detected for the first time and at the point of time (for example, time t6) when the detection of the motion of the person is finished, to access point 10. In FIG. 9, at times t2, t3, t4, and t5, the motion of the person continues to be detected by camera 30, and the motion of the person is no longer detected by camera 30 at the timing of time t6 for the first time (that is, the detection of the motion of the person ends). In this case, camera 30 transmits the before-and-after notification to access point 10 and further transmits each of the captured images at times t1 and t6 (that is, the pair of two captured images) to access point 10.

In addition, the motion non-detection time efficiently functions, for example, even in a case where the before-and-after notification is set in access point 10 after the motion detection end waiting time and before the motion non-detection time ends, and camera 30 does not perform the processing of detecting the motion of the person. In addition, after the motion non-detection time has ended (that is, after time t8), camera 30 performs the processing of detecting the motion of the person. Therefore, as illustrated in FIG. 9, the motion detection end waiting time (for example, 27 seconds) is set to be shorter than the motion non-detection time (for example, 30 seconds). Although not illustrated in FIG. 9, in a case where the motion of the person is detected at time t9 after the motion non-detection time has elapsed, camera 30 measures the motion detection end waiting time starting at time t1 and the motion non-detection time.

Further, in FIG. 9, when camera 30 detects the motion of the person at time t1 in a case where the before-and-after notification is set in access point 10, camera 30 discontinues the processing of detecting the motion of the person from time t1 to the predetermined time period (for example, 10 seconds as an example of the second predetermined time). When the predetermined time period has elapsed, camera 30 resumes the discontinued processing of detecting the motion of the person. This is based on the concern in that when camera 30 continues to perform the detection processing after camera 30 detects the motion of the person for the first time the power consumption of camera 30 driven by the battery increases, and that the time period during which there is a possibility that a change in some situation occurs after the motion of the person is detected for the first time, for example, is 10 seconds.

Accordingly, in camera 30, it is possible to suppress an increase in power consumption occurring when camera 30 continues to detect the motion of the person for a predetermined time period (for example, 10 seconds as an example of a second predetermined time period) from time t1 when the motion of the person is detected for the first time. In addition, the motion non-detection time (for example, 30 seconds) is preferentially applied to access point 10, for example, in a case where the immediate notification is set, and as soon as the motion of the person is detected at time t1, the detection of the motion of the person is not performed until the motion non-detection time (for example, 30 seconds) elapses after time t1. Accordingly, until the motion non-detection time (for example, 30 seconds) elapses from time t1, access point 10 can omit the transmission of the motion detection notification (so-called push notification) with respect to smartphone 50 even when the person continues staying in the imaging area of camera 30, and thus, it is possible to suppress performing of frequent push notification (that is, excessive generation of push notification) from access point 10 to smartphone 50, and causing an unpleasant impression to the user can be prevented.

Further, for example, when acquiring the shift instruction to the standby mode transmitted from access point 10 during the sleep mode, controller 309 shifts (that is, switches) the operation mode of camera 30 from the sleep mode to the standby mode.

Camera 30 has wireless LAN controller 321 and wireless LAN communication I/F 322. Using wireless LAN controller 321 and wireless LAN communication I/F 322, camera 30 transmits data of the captured video captured by camera 30 or data of voice collected by camera 30 to router 20 and smartphone 50 via access point 10 wirelessly connected by the wireless LAN. In addition, using wireless LAN controller 321 and wireless LAN communication I/F 322, camera 30 receives various types of data, information, or instructions related to the processing which are transmitted from smartphone 50 from router 20 or smartphone 50 via access point 10 wirelessly connected by the wireless LAN.

Camera 30 includes voice bus 307, voice input and output controller 304, speaker 329, and microphone 328, and performs calling processing by inputting and outputting the voice, for example, with smartphone 50. A voice signal (voice data) collected by microphone 328 is input to video memory controller 316 via voice bus 307, and is temporarily stored (buffered) or stored in video memory 315 as video together with the signal (data of captured image) of the captured image captured by capture 312. In addition, when transmitting the data of the captured video buffered or stored in video memory 315 to access point 10, camera 30 reads the data of the captured video from video memory 315 in video memory controller 316 and outputs the data to wireless LAN controller 321. Wireless LAN controller 321 transmits the data of the captured video read from video memory 315 to access point 10 via wireless LAN communication I/F 322 and an antenna.

Camera 30 includes capture 312, video memory controller 316, and video memory 315, and stores the data of the captured video of the imaging area captured by capture 312 in video memory 315 via video memory controller 316. Capture 312 is configured using a lens and an imaging element (for example, an image sensor, such as a charged coupled device (CCD) or a complementary metal oxide semiconductor (CMOS). When buffering (refer to the description below) of the data of the captured video which is performed after camera 30 is shifted to the standby mode, video memory 315 temporarily buffers (stores) the data of the captured video.

As an example of a motion sensor, camera 30 integrally incorporates infrared sensor 313 which is a passive infra red (PIR) sensor. Camera 30 may have a plurality of infrared sensors 313. In this case, based on the detection result of the person in the plurality of different infrared sensors 313, controller 309 may specify, for example, a moving direction of the person (for example, a direction in which the person returns the inside of the individual house from the entrance, or a direction in which the person goes out of the individual house passing through the entrance). By detecting a change in heat (for example, infrared light) emitted from the person, infrared sensor 313 senses (detects) the presence of the person in a detection target region of predetermined infrared sensor 313. In a case of detecting the presence of the person in the detection target region, infrared sensor 313 sends a person detection notification to controller 309.

In the embodiment, although camera 30 is driven by battery 314, infrared sensor 313 operates not only in the standby mode but also in the sleep mode. In other words, infrared sensor 313 constantly operates while the power source of camera 30 is on even when the operation mode of camera 30 is in either the sleep mode or the standby mode, and senses the presence of the person in the detection target region.

Battery 314 supplies necessary electric power to each part of camera 30. Battery 314 is, for example, four D-size batteries used as a power source of camera 30. In addition, battery 314 may be a rechargeable secondary battery, such as a nickel hydrogen battery, a lithium ion battery, or a lead battery, as well as a primary battery, such as a manganese dry battery or an alkaline dry battery.

FIG. 5 is a block diagram illustrating an example of an inner configuration of the smartphone. Smartphone 50 includes controller 506, storage 504, and display and operator (for example, a touch panel) 503. For example, smartphone 50 is possessed by the user residing in the individual house, receives various input operations from the user, and displays information such as an image (for example, the pair of two captured images transmitted from access point 10 via router 20) on display and operator 503.

Display and operator 503 (an example of the display) is a display input in which the display and the operator are integrated, and displays information, such as images or icons, on the screen. Display and operator 503 displays a captured image (for example, the pair of two captured images, refer to FIG. 7) transmitted from access point 10 via router 20, and receives an instruction operation (for example, a touch operation, a tap operation, and a long press operation) from the user with respect to the screen.

Storage 504 is configured using, for example, the RAM and the ROM, holds programs and data necessary for the operation of smartphone 50 in the ROM, and temporarily holds data or information in the RAM when performing various types of processing using the program and data in controller 506. In addition, storage 504 stores the programs and data of a security monitoring application (not illustrated) of individual houses using monitoring camera system 100 according to the embodiment. In other words, the security monitoring application is installed in smartphone 50 in advance so that the security monitoring application can be executed. In addition, storage 504 stores data of the pair of two captured images based on the push notification (refer to FIG. 7) transmitted from access point 10.

In addition, smartphone 50 includes mobile telephone network communication protocol controller 502 and mobile telephone network communication I/F 501, is wirelessly connected to other mobile phones or smartphones connected to a mobile telephone network (not illustrated) using any wireless communication methods among 3G (third generation mobile communication system), 4G (fourth generation mobile communication system), or 5G (fifth generation mobile communication system), and performs the wireless communication related to the transmission and reception of image, voice, or video.

Further, smartphone 50 has voice bus 515, voice input and output controller 505, speaker 513, and microphone 512, and inputs and outputs voice to and from the outside.

Further, smartphone 50 includes wireless LAN controller 507 and wireless LAN communication I/F 508, and performs transmission and reception of data, such as image, voice, and video, to and from access point 10 or camera 30 via router 20 connected via a wireless LAN. In addition, when there is an input operation by the user who operates smartphone 50, smartphone 50 transmits a signal by the operation to access point 10 via router 20, and requests acquisition of the pair of two captured images captured by camera 30 from access point 10.

In addition, smartphone 50 includes a USB communication I/F 511, and transmits and receives data to and from devices or memory having an interface of a universal serial bus (USB) standard.

Secondary battery 550 supplies necessary electric power to each part of smartphone 50. Secondary battery 550 is a rechargeable battery, such as a nickel hydrogen battery, a lithium ion battery, or a lead battery.

Next, regarding the operation of monitoring camera system 100 according to the embodiment, a first use case (refer to FIGS. 6A and 6B) and a second use case (refer to FIGS. 10A and 10B) will be described.

(First Use Case)

FIG. 6A is an explanatory view illustrating an example of a movement path when suspicious person SUS stays while wandering around an imaging area of camera 30A near the entrance and leaves the individual house after a certain period of time. FIG. 6B is a sequence view illustrating an example of an operation order of access point 10, camera 30A near the entrance, and smartphone 50 possessed by the user, which correspond to the movement path of suspicious person SUS illustrated in FIG. 6A. In order to make it easy to understand the description of FIG. 6B, for example, camera 30A of FIG. 6A is illustrated as an example of the camera of FIG. 6B, but it is needless to say that the camera is not limited to camera 30A.

In FIG. 6A, an aspect in which suspicious person SUS unknown to the user approaches the entrance where camera 30A is installed around the individual house of the user where monitoring camera system 100 illustrated in FIG. 1 and FIG. 2 is installed, looks for the individual house while wandering in front of the entrance, and then (for example, timing after the motion of suspicious person SUS is detected for the first time before the motion detection end waiting time elapses), runs away to escape from the individual house, is illustrated.

In the description of FIG. 6B, for example, the before-after-notification is installed in access point 10.

Although not illustrated in FIG. 6B, for example, the power source of camera 30A is powered on, but camera 30A is in the sleep mode. When detecting the person (for example, suspicious person SUS) who has appeared in the imaging area (for example, in front of the entrance) in infrared sensor 313, for example, camera 30A autonomously shifts the operation mode from the sleep mode to the standby mode. In addition, camera 30A may have already been shifted to the standby mode before detecting the person (for example, suspicious person SUS) who has appeared in the imaging area (for example, in front of the entrance) in infrared sensor 313.

In the standby mode, camera 30A detects that the motion of the person (for example, suspicious person SUS) detected by infrared sensor 313 is detected by controller 309, for example, based on the image processing using interframe differences of the plurality of captured images (S1). Since the before-and-after notification is set to access point 10, controller 309 of camera 30A continues the processing of detecting the motion of suspicious person SUS until the motion detection end waiting time (for example, 27 seconds) elapses after the detection time (an example of a first timing) of the motion of suspicious person SUS in step S1, based on the output of timer 309T. However, as described above, in order to suppress an increase in power consumption in camera 30A, camera 30A discontinues the processing of detecting the motion of suspicious person SUS only for a predetermined time period (for example, 10 seconds) after the detection time of the motion of suspicious person SUS in step S1. In addition, camera 30A acquires the data of the captured image captured by capture 312 when the motion of suspicious person SUS is detected for the first time in controller 309 (S1). Camera 30A transmits the motion detection notification indicating that the motion of suspicious person SUS has been detected in step S1, to access point 10 (S2).

When receiving the motion detection notification transmitted from camera 30A in step S2, access point 10 generates an acquisition request of the captured image of the person who is a target of the motion detection notification (that is, suspicious person SUS whose motion is detected in step S1) in controller 101, and transmits the acquisition request to camera 30A (S3).

When receiving the acquisition request of the captured image transmitted from access point 10 in step S3, camera 30A transmits the data of the captured image acquired in step S1 (that is, an example of the captured image captured by capture 312 when the motion of suspicious person SUS is detected for the first time, which is an example of a first captured image) to access point 10 (S4).

When receiving the data of the captured image transmitted from camera 30A in step S4, access point 10 temporarily stores (holds) the data in the RAM (not illustrated) embedded in access point 10 in controller 101 (S5). In addition, as described above, in the description of FIG. 6B or FIG. 10B which will be described later, the before-and-after notification is set to access point 10, but in a case where the immediate notification is set in access point 10, access point 10 generates a motion detection notification according to a predetermined format displayed on smartphone 50 based on the motion detection notification transmitted from camera 30A in step S2, and transmits the motion detection notification as a push notification to smartphone 50. In the following description, the push notification is a notification for notifying the user who possesses smartphone 50 of the fact that the motion of the person is detected or a function of generating the notification, even in a state where the security monitoring application related to monitoring camera system 100 installed in advance in smartphone 50 has not been activated.

When suspicious person SUS wanders in the imaging area of the camera 30A, it can be said that camera 30A is in a state where the motion of suspicious person SUS is continuously detected (refer to a period between steps S1 and S6). Here, it is assumed that suspicious person SUS runs away from the individual house illustrated in FIG. 6A before the motion detection end waiting time (for example, 27 seconds) of camera 30A ends after the motion is detected by camera 30A in step S1.

Therefore, since camera 30A no longer detects the motion of suspicious person SUS in controller 309, the detection of the motion of suspicious person SUS ends (S6). In addition, camera 30A acquires the data of the captured image captured by capture 312 when the motion of suspicious person SUS is not detected (an example of a second timing) in controller 309 (S6). In step S6, camera 30A acquires the data of the captured image acquired in step S1 again. Camera 30A generates a before-and-after notification (an example of a predetermined notification) including the fact that the motion of suspicious person SUS is detected in step S1 (for example, the fact that the motion of suspicious person SUS is detected at time t1 illustrated in FIG. 9) and the fact that the motion of suspicious person SUS is not detected in step S6 (for example, the fact that the motion of suspicious person SUS is not detected at time t6 illustrated in FIG. 9) in controller 309, and transmits the before-and-after notification to access point 10 (S7).

When access point 10 receives the before-and-after notification transmitted from camera 30A in step S7, access point 10 generates an acquisition request (an example of the image request) of the pair of two captured images at the point of time which is a target of the before-and-after notification (that is, the point of time when the motion of suspicious person SUS is detected in step S1 and the point of time when the motion of suspicious person SUS is no longer detected in step S6) in controller 101, and transmits the acquisition request to camera 30A (S8).

When receiving the acquisition request of the pair of two captured images transmitted from access point 10 in step S8, camera 30A transmits the data of the pair of two captured images acquired in step S6 (that is, the captured image captured by capture 312 when the motion of suspicious person SUS is detected for the first time (an example of a first captured image), and the captured image captured by capture 312 when the motion of suspicious person SUS is not detected (an example of a second captured image) to access point 10 (S9).

When receiving the data of the pair of two captured images transmitted from camera 30A in step S9, access point 10 temporarily stores (holds) the data in the RAM (not illustrated) embedded in access point 10 in controller 101 (S10). In addition, based on the motion detection notification transmitted from camera 30A in step S7, access point 10 generates the before-and-after notification according to a predetermined format displayed on smartphone 50 in controller 101 and sends the before-and-after notification to smartphone 50 as a push notification (S11).

Smartphone 50 receives the before-and-after notification (push notification) transmitted from access point 10 in step S11. Smartphone 50 generates an acquisition request of the two captured images captured at the point of times corresponding to the before-and-after notification (that is, the point of time when the motion of the suspicious person SUS is detected in step S1 and the point of time when the motion of the suspicious person SUS is not detected in step S6) in controller 506, and transmits the acquisition request to access point 10 (S12).

Access point 10 receives the acquisition request of the pair of two captured images transmitted from smartphone 50 in step S12. Access point 10 acquires the data of the pair of two captured images held in step S10 (that is, the captured image captured by capture 312 when the motion of suspicious person SUS is detected for the first time and the pair of captured images captured by capture 312 when the motion of suspicious person SUS is not detected) in controller 101, and transmits the data to smartphone 50 (S13).

Smartphone 50 receives the data of the pair of two captured images (that is, the pair of the captured image captured by capture 312 when the motion of suspicious person SUS is detected for the first time and a captured image captured by the capture 312 when motion of suspicious person SUS is no longer detected) transmitted from access point 10 in step S11. After receiving the data of the above-described pair of two captured images, smartphone 50 generates push notification icon IC1 that corresponds to the before-and-after notification in controller 506, and displays push notification icon IC1 on display and operator 503 (S14).

After the motion non-detection time has elapsed from the time when the motion of suspicious person SUS is detected in step S1, camera 30A performs the processing of detecting the motion of the person again. After the motion non-detection time elapses, when camera 30A detects the motion of the same suspicious person SUS or another person, at the time of the detection, camera 30A acquires the data of the captured image captured by capture 312 in controller 309 (S1). After step S1, the processing from step S2 to step S14 is repeated in camera 30A, access point 10, and smartphone 50.

Figure 8A:
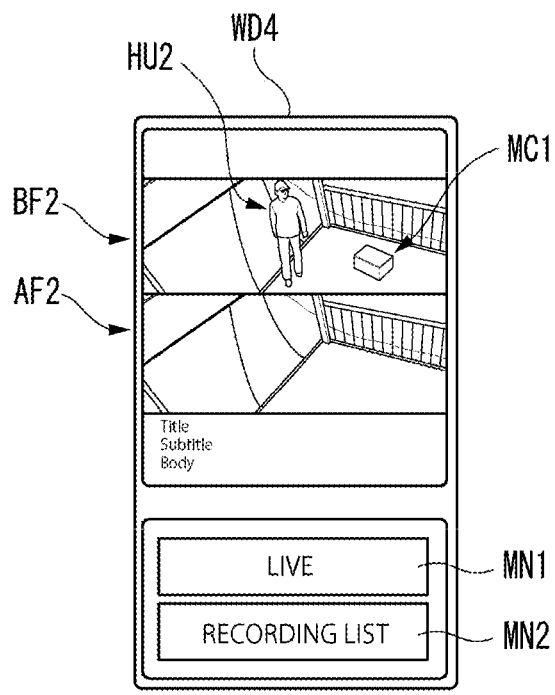
FIG. 8A is a view illustrating a display example on the smartphone of a before image and an after image in a case where a person who has approached the camera near the entrance is a thief.
Figure 8B:
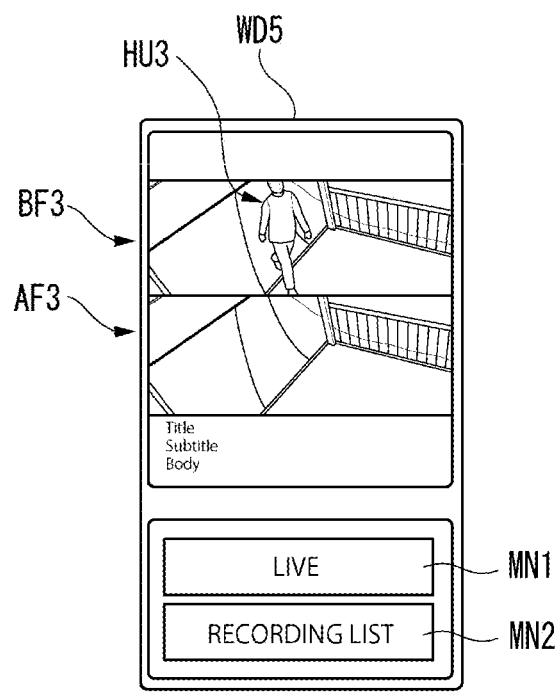
FIG. 8B is a view illustrating a display example on the smartphone of a before image and an after image in a case where a person who has approached the camera near the entrance is a resident.

FIG. 7 is a view illustrating a transition example of a screen displayed on smartphone 50. FIG. 8A is a view illustrating a display example on smartphone 50 of before image BF2 and after image AF2 in a case where person HU2 who has approached camera 30A near the entrance is a thief. FIG. 8B is a view illustrating a display example on smartphone 50 of before image BF3 and after image AF3 in a case where person HU3 who has approached camera 30A near the entrance is a resident. In the description of FIG. 8A and FIG. 8B, the description will be simplified or omitted for details overlapping with the description of FIG. 7.

In step S14 of FIG. 6B, display and operator 503 of smartphone 50 displays push notification icon IC1 on screen WD1 (so-called home screen) on the left side of the page of FIG. 7, for example. At the time when screen WD 1 is displayed, the security monitoring application is not activated. Push notification icon IC1 indicates, for example, the title and the subtitle of two captured images which are a target of the before-and-after notification. In other words, the user can simply confirm by push notification icon IC1 that the data of the pair of two captured images captured by camera 30A has been delivered to smartphone 50 without performing an operation of activating the security monitoring application.

When an operation of the user (that is, a notification image display operation (for example, a long press operation and a downward slide operation)) is performed on display and operator 503 on which push notification icon IC1 is displayed, smartphone 50 displays screen WD2 in a predetermined format including the data of the pair of two captured images (specifically, before image BF1 and after image AF1) that corresponds to push notification icon IC1. Before image BF1 is the image acquired in step S1 illustrated in FIG. 6B (that is, the captured image captured by camera 30A when the motion of the person HU1 is detected). After image AF1 is the image acquired in step S6 illustrated in FIG. 6B (that is, the captured image captured by camera 30A when the motion of the person HU1 is not detected). In other words, the user can simply confirm the data of the pair of two captured images captured by camera 30A without performing the operation of activating the security monitoring application.

On central screen WD2 of FIG. 7, before image BF1 when person HU1 (for example, a delivery person) arrives at the entrance of the individual house for package MC1 that is a delivery target and after image AF1 when person HU1 leaves from the entrance and the motion of person HU1 is no longer detected, in accordance with the before image BF1, are comparatively illustrated. Therefore, the user visually recognizes before image BF1 and after image AF1 which are displayed on smartphone 50 in a comparative manner, and thus, a situation in which person HU1 comes to deliver package MC1 and has left package MC1 thereafter (for example, a situation in which the delivery person delivers the package MC1 which is a delivery item for the individual house) can be easily grasped. In addition, on the lower side of the page of after image AF1, the title and the subtitle illustrated in push notification icon IC 1 are displayed.

Further, on screen WD2, in the security monitoring application, menu candidates, specifically, live button MN1 for watching live video of any camera (for example, camera 30A) and a recording list button MN2 of the data of the captured video captured by any camera (for example, camera 30A), are displayed. When any of the buttons is selected by the operation of the user, smartphone 50 activates the security monitoring application and executes a function (menu) that corresponds to the selected button.

For example, in a case where the live button MN1 is selected by the operation of the user (for example, a tap operation), smartphone 50 activates the security monitoring application and, for example, requests the live video from the camera 30A via router 20 and access point 10. When receiving the data of live video RL1 transmitted from camera 30A in accordance with the request, smartphone 50 displays live video RL1 and an image EX1, which is obtained by cutting out a part of live video RL1 and enlarging the part, for example, vertically and comparatively on screen WD3 of the security monitoring application in display and operator 503. The smartphone 50 displays the dotted line indicating corresponding range SL1 of live video RL1 displayed as image EX1 in the display and operator 503, on live video RL1. Further, for example, when image EX1 containing package MC1 is moved (for example, slides) by the operation of the user, controller 506 moves corresponding range SL1 of live video RL1 and displays range SL1 on display and operator 503 in order to correspondingly follow moved image EX1 in the security monitoring application. For example, in a case where image EX1 is enlarged by the operation of the user, smartphone 50 switches the display to reduce the size of range SL1 to match the enlargement ratio based on each size of enlarged image EX1 and unexpanded image EX1.

In addition, when the operation of the user (that is, a notification image display operation (for example, a long press operation and a downward slide operation)) is performed on display and operator 503 on which push notification icon IC1 illustrated in FIG. 7 is displayed, smartphone 50 may display screen WD4 in a predetermined format including the data of the pair of two captured images (specifically, before image BF2 and after image AF2) that corresponds to push notification icon IC1 (refer to FIG. 8A). Before image BF2 is the image acquired in step S1 illustrated in FIG. 6B (that is, the captured image captured by camera 30A when the motion of the person HU2 is detected). After image AF2 is the image acquired in step S6 illustrated in FIG. 6B (that is, the captured image captured by camera 30A when the motion of the person HU2 is not detected).

On screen WD4 of FIG. 8A, before image BF2 when person HU2 (for example, a thief) is about to take away the package MC1 which has been delivered and placed in front of the entrance, and after image AF2 when person HU2 takes away the package MC1 and the motion of the person HU2 is no longer detected, in accordance with before image BF2, are comparatively illustrated in a row. Therefore, the user visually recognizes before image BF2 and after image AF2 which are displayed on smartphone 50 in a comparative manner, and thus, a situation in which person HU2 approaches package MC1 and takes away package MC1 thereafter (for example, a situation in which the thief takes the package MC1 which is a delivery item for the individual house and runs away) can be easily grasped.

In addition, when the operation of the user (that is, the notification image display operation (for example, a long press operation and a downward slide operation)) is performed on display and operator 503 on which push notification icon IC1 illustrated in FIG. 7 is displayed, smartphone 50 may display screen WD5 in a predetermined format including the data of the pair of two captured images (specifically, before image BF3 and after image Af3) that corresponds to push notification icon IC1 (refer to FIG. 8B). Before image BF3 is the image acquired in step S1 illustrated in FIG. 6B (that is, the captured image captured by camera 30A when the motion of the person HU3 is detected). After image AF3 is the image acquired in step S6 illustrated in FIG. 6B (that is, the captured image captured by camera 30A when the motion of the person HU3 is not detected).

On screen WD5 of FIG. 8B, before image BF3 when person HU3 (for example, a resident of the individual house, that is, a user who is a member of the family) approaches the entrance of the individual house, and after image AF3 when person HU3 enters the individual house and the motion of person HU3 is no longer detected in accordance with before image BF3, are comparatively illustrated in a row. Therefore, the user visually recognizes before image BF3 and after image AF3 which are displayed on smartphone 50 in a comparative manner, and thus, a situation in which person HU3 approaches the individual house and returns the individual house thereafter can be easily grasped.

(Second Use Case)

FIG. 10A is an explanatory view illustrating an example of the movement path when suspicious person SUS continues to wander through the imaging area of camera 30A near the entrance all the time. FIG. 10B is a sequence view illustrating an example of an operation order of access point 10, camera 30A near the entrance, and smartphone 50 possessed by the user, which correspond to the movement path of suspicious person SUS illustrated in FIG. 10A. In order to make it easy to understand the description of FIG. 10B, for example, camera 30A of FIG. 10A is illustrated as an example of the camera of FIG. 10B, but it is needless to say that the camera is not limited to camera 30A.

In FIG. 10A, an aspect in which suspicious person SUS unknown to the user approaches the entrance where camera 30A is installed around the individual house of the user where monitoring camera system 100 illustrated in FIG. 1 and FIG. 2 is installed, and looks for the individual house while wandering in front of the entrance all the time, is illustrated. In FIG. 10A, suspicious person SUS is different from FIG. 6A in that suspicious person SUS stays in the imaging area of camera 30A even after the motion detection end waiting time has elapsed after the motion of suspicious person SUS was detected for the first time.

In the description of FIG. 10B, for example, the before-and-after notification is set in access point 10. In the description of FIG. 10B, the same step numbers are assigned to the same processing as the processing of FIG. 6B, the description will be simplified or omitted, and different contents will be described.

Although not illustrated in FIG. 10B, for example, the power source of camera 30A is powered on, but camera 30A is in the sleep mode. When detecting the person (for example, suspicious person SUS) who has appeared in the imaging area (for example, in front of the entrance) in infrared sensor 313, camera 30A autonomously shifts the operation mode from the sleep mode to the standby mode. In addition, camera 30A may have already been shifted to the standby mode before detecting the person (for example, suspicious person SUS) who has appeared in the imaging area (for example, in front of the entrance) in infrared sensor 313.

When suspicious individual SUS wanders in the imaging area of camera 30A, it can be said that camera 30A is in a state of continuously detecting the motion of suspicious person SUS (refer to a period between steps S1 and S6A). It is assumed that suspicious person SUS wanders in front of the entrance (that is, an imaging area of camera 30A) of the individual house illustrated in FIG. 6A even at the point of time when the motion detection end waiting time (for example, 27 seconds) of camera 30A ends after the motion is detected by camera 30A in step S1. In other words, even when the motion detection end waiting time (for example, 27 seconds) has ended, the motion of suspicious person SUS is detected by camera 30A.

Therefore, camera 30A is in a state of continuously detecting the motion of suspicious person SUS in controller 309, but since the motion detection end waiting time (for example, 27 seconds) has ended, camera 30A acquires the data of the captured image captured by capture 312 at the point of time when the motion detection end waiting time ends (for example, 27 seconds) in controller 309 (S6A). In step S6A, camera 30A acquires the data of the captured image acquired in step S1 again. Camera 30A generates the before-and-after notification including the fact that the motion of suspicious person SUS is detected in step S1 (for example, the fact that the motion of suspicious person SUS is detected at time t1 illustrated in FIG. 9) and the fact that the motion detection end waiting time (for example, 27 seconds) has ended in step S6A (that is, the fact that the motion of suspicious person SUS is still being detected) in controller 309, and transmits the before-and-after notification to access point 10 (S7). Since the processing after step S7 is the same as that in FIG. 6B, the following description will be omitted.

Above, monitoring camera system 100 according to the embodiment includes at least one of cameras 30A, 30B, 30C, and 30D and access point 10 in which cameras 30A, 30B, 30C, and 30D and smartphone 50 having display and operator 503 can communicate with each other. The camera (for example, camera 30A) detects the motion of the person (for example, suspicious person SUS) at the first timing in the imaging area, and transmits a predetermined notification (for example, the before-and-after notification) to access point 10 at the second timing after the first timing. The access point 10 transmits the image request for requesting the first captured image captured at the first timing and the second captured image captured at the second timing by camera 30A from camera 30A, to camera 30A, based on the predetermined notification transmitted from camera 30A. Camera 30A transmits the first captured image and the second captured image to access point 10 in association with each other based on the image request transmitted from access point 10. Access point 10 transmits the first captured image and the second captured image transmitted from camera 30A to smartphone 50 so as to be displayed in association with each other on display and operator 503.

Accordingly, since monitoring camera system 100 transmits at least the pair of two captured images respectively indicating the situations of the plurality of monitoring timings, which are captured by camera 30 provided for one or more monitoring applications to smartphone 50, it is possible to present the difference in monitoring situation based on the difference between each of the monitoring timings so that the user can grasp the situation in detail. Therefore, while monitoring camera system 100 can efficiently monitor the individual house where camera 30 is installed, it is possible to improve the convenience of monitoring camera system 100 for the user living in the individual house.

In addition, the second timing is the timing at which the detection of the movement of the person (for example, suspicious person SUS) in camera 30 ends. Accordingly, since monitoring camera system 100 can transmit the captured image at the timing when the motion of the person (for example, suspicious person SUS) is detected for the first time and the captured image at the timing when the motion of the person (for example, suspicious person SUS) is no longer detected in association with each other to smartphone 50, it is possible to grasp in detail the contents of the change in the situation of the imaging area of camera 30 or the presence or absence of change in the imaging area of camera 30 due to the fact that the motion of the person (for example, suspicious person SUS) is not detected.

In addition, the second timing is the timing when the first predetermined time period (for example, 27 seconds, that is, the motion detection end waiting time) has elapsed from the first timing. Accordingly, monitoring camera system 100 can transmit the captured image at the timing when the motion of the person (for example, suspicious person SUS) is detected for the first time and the captured image at the timing when the motion detection end waiting time ends in association with each other, to smartphone 50. Therefore, while monitoring camera system 100 can make the user grasp the contents of the captured image of the person (for example, suspicious person SUS) at two different monitoring timings, the processing of detecting the motion of the person (for example, suspicious person SUS) is not performed more than necessary until exceeding the motion detection end waiting time, and thus, it is possible to effectively suppress an increase in power consumption of camera 30 configured by battery driving.

In addition, camera 30 discontinues the processing of detecting the motion of the person (for example, suspicious person SUS) until the second predetermined time period (for example, 10 seconds) elapses from the first timing and resumes the processing of detecting the motion after the second predetermined time period has elapsed from the first timing. Accordingly, as camera 30 continues to perform the detection processing constantly after camera 30 detects the motion of the person for the first time, it is possible to suppress an increase in power consumption in camera 30 driven by a battery, and efficient monitoring is performed in anticipation of the passage of time that there is a possibility that some situation change may occur after the motion of the person is detected for the first time.

In addition, the first captured image and the second captured image are displayed side by side on display and operator 503 of smartphone 50. Accordingly, the user visually recognizes the first captured image (for example, before image BF1) and the second captured image (for example, after image AF1) which are displayed on smartphone 50 in a comparative manner, and thus, a situation in which person HU1 of before image BF1 comes to deliver package MC1 and has left package MC1 thereafter (for example, a situation in which the delivery person delivers the package MC1 which is a delivery item for the individual house) can be easily grasped. In addition, the user visually recognizes the first captured image (for example, before image BF2) and the second captured image (for example, after image AF2) which are displayed on smartphone 50 in a comparative manner, and thus, a situation in which person HU2 approaches package MC1 and takes away package MC1 thereafter (for example, a situation in which the thief takes the package MC1 which is a delivery item for the individual house and runs away) can be easily grasped. In addition, the user visually recognizes the first captured image (for example, before image BF3) and the second captured image (for example, after image AF3) which are displayed on smartphone 50 in a comparative manner, and thus, a situation in which person HU3 approaches the individual house and returns the individual house thereafter can be easily grasped.

Above, while the embodiments according to the disclosure have been described with reference to the drawings, it is needless to say that the disclosure is not limited to the examples. It is apparent for those skilled in the art that various modification examples or correction examples can be conceived within the scope described in the claims and those skilled in the art understand that the examples naturally fall within the technical scope of the disclosure. Further, within the scope not departing from the gist of the invention, each of the configuration elements in the above-described embodiment may be combined in any manner.

What is claimed is:

1. A monitoring camera system, comprising:
    a camera; and
    a master device, which, in operation, communicates with the camera and a mobile communication terminal having a display,
    wherein the camera, in operation, detects, at a first timing, a presence of a person in an imaging area by detecting motion of the person in the imaging area, and captures a first image including the person in the imaging area in response to the camera detecting the motion of the person,
    wherein the camera, in operation, determines, at a second timing after the first timing, the person is not present in the imaging area by determining the motion of the person is no longer being detected by the camera, and captures a second image including the imaging area without the person in response to the camera determining the motion of the person is no longer being detected by the camera,
    wherein the camera, in operation, transmits a first before-and-after notification to the master device in response to the first image and the second image being captured,
    wherein the master device, in operation, transmits, in response to the first before-and-after notification transmitted from the camera being received by the master device, an image request for requesting the first image and the second image to the camera,
    wherein the camera, in operation, transmits, in response to the image request transmitted from the master device being received by the camera, the first image and the second image together to the master device, and
    wherein the master device, in operation and in response to the master device receiving the first image and the second image from the camera, holds the first image and the second image, and transmits a second before-and-after notification to the mobile communication terminal,
    wherein each of the first before-and-after notification and the second before-and-after notification indicates both the camera detected the motion of the person in the imaging area, and the camera determined the motion of the person is no longer being detected by the camera,
    wherein the master device, in operation, transmits, subsequent to the second before-and-after notification being transmitted, the first image and the second image together to the mobile communication terminal to be displayed on the display.

2. The system of claim 1,
    wherein the camera, in operation, discontinues processing of detecting movement until a predetermined time period elapses from the first timing, and resumes processing of detecting movement after the predetermined time period has elapsed from the first timing.

3. The system of claim 1,
    wherein the first image and the second image are displayed side by side in the display of the mobile communication terminal.

4. A monitoring method for a monitoring camera system including a camera and a master device in communication with the camera and a mobile communication terminal having a display, the monitoring method comprising:
    detecting, by the camera, at a first timing, a presence of a person in an imaging area by detecting motion of the person in the imaging area;
    capturing, by the camera, a first image including the person in the imaging area in response to the camera detecting the motion of the person;
    determining, by the camera, at a second timing after the first timing, the person is not present in the imaging area by determining the motion of the person is no longer being detected by the camera,
    capturing, by the camera, a second image including the imaging area without the person in response to the camera determining the motion of the person is no longer being detected by the camera;
    transmitting, by the camera, a first before-and-after notification to the master device in response to the first image and the second image being captured;
    transmitting, by the master device and in response to the first before-and-after notification transmitted from the camera being received by the master device, an image request for requesting the first image and the second image to the camera;
    transmitting, by the camera and in response to the image request transmitted from the master device being received by the camera, the first image and the second image together to the master device;
    holding, by the master device and in response to the master device receiving the first image and the second image from the camera, the first image and the second image,
    transmitting, by the master device and in response to the master device receiving the first image and the second image from the camera, a second before-and-after notification to the mobile communication terminal; and transmitting, by the master device and subsequent to the second before-and-after notification being transmitted, the first image and the second image together to the mobile communication terminal to be displayed on the display, wherein each of the first before-and-after notification and the second before-and-after notification indicates both the camera detected the motion of the person in the imaging area, and the camera determined the motion of the person is no longer being detected by the camera.

5. The system of claim 1,
wherein the mobile communication terminal displays the first image and the second image concurrently.

6. The system of claim 1, wherein
the first image is a single image of the person in the imaging area, and the second image is a single image of the imaging area.

7. The system of claim 1, wherein
the master device, in operation, holds the first image and the second image from being transmitted to the mobile communication terminal until the mobile communication terminal requests the first image and the second image from the master device.

8. The method of claim 4, further comprising:
discontinuing, by the camera, processing of detecting movement until a predetermined time period elapses from the first timing, and resumes processing of detecting movement after the predetermined time period has elapsed from the first timing.

9. The method of claim 4, further comprising:
holding, by the master device, the first image and the second image from being transmitted to the mobile communication terminal until the mobile communication terminal requests the first image and the second image from the master device.

* * * * *